(12) United States Patent
Krull et al.

(10) Patent No.: US 7,184,886 B1
(45) Date of Patent: *Feb. 27, 2007

(54) NAVIGATION SYSTEM, METHOD AND DEVICE WITH DETOUR ALGORITHM

(75) Inventors: Jay Dee Krull, Olathe, KS (US); Michael Childs, Olathe, KS (US); Shane R. Runquist, Austin, TX (US)

(73) Assignee: Garmin Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/380,545

(22) Filed: Apr. 27, 2006

Related U.S. Application Data

(60) Division of application No. 11/035,243, filed on Jan. 13, 2005, which is a division of application No. 10/701,771, filed on Nov. 5, 2003, now Pat. No. 6,999,873, which is a continuation of application No. 10/028,343, filed on Dec. 21, 2001, now Pat. No. 6,687,615.

(51) Int. Cl.
*G01C 21/30* (2006.01)
(52) U.S. Cl. .................... 701/209; 701/208; 701/207
(58) Field of Classification Search ............. 701/200, 701/201, 207–213; 340/905, 988–90
See application file for complete search history.

(56) References Cited

U.S. PATENT DOCUMENTS

| 3,660,812 A | 5/1972 | Inose et al. |
| 3,883,847 A | 5/1975 | Frank |
| 4,811,613 A | 3/1989 | Phillips et al. |
| 4,827,419 A | 5/1989 | Selby |
| 4,831,563 A | 5/1989 | Ando et al. |
| 4,924,402 A | 5/1990 | Ando et al. |
| 4,926,336 A | 5/1990 | Yamada |
| 4,937,753 A | 6/1990 | Yamada |
| 5,208,593 A | 5/1993 | Tong et al. |
| 5,220,509 A | 6/1993 | Takemura et al. |

(Continued)

FOREIGN PATENT DOCUMENTS

AT          209809 T     12/2002

(Continued)

OTHER PUBLICATIONS

U.S. Appl. No. 10/032,250, filed Dec. 21, 2001, Childs et al.

(Continued)

*Primary Examiner*—Richard M. Camby
(74) *Attorney, Agent, or Firm*—David L. Terrell

(57) ABSTRACT

Systems, devices and methods are provided for an improved navigational route planning device which provides more understandable, accurate and timely route calculation capabilities. The navigational aid device with route calculation capabilities includes a processor connected to a memory. The memory includes cartographic data and a desired destination, the cartographic data including data indicative of thoroughfares of a plurality of types. A display is connected to the processor and is capable of displaying the cartographic data. The device is adapted to process the device=s location and travel along a planned route. And, the device is adapted to dynamically calculate a new route to the desired destination with a preference for avoiding a particular portion of a thoroughfare or one or more different thoroughfares in a previous route.

12 Claims, 7 Drawing Sheets

U.S. PATENT DOCUMENTS

| | | | |
|---|---|---|---|
| 5,243,529 A | 9/1993 | Kashiwazaki | |
| 5,272,638 A | 12/1993 | Martin et al. | |
| 5,297,051 A | 3/1994 | Arakawa et al. | |
| 5,331,563 A | 7/1994 | Masumoto et al. | |
| 5,343,399 A | 8/1994 | Yokoyama et al. | |
| 5,349,530 A | 9/1994 | Odagawa | |
| 5,363,306 A | 11/1994 | Kuwahara et al. | |
| 5,365,448 A | 11/1994 | Nobe et al. | |
| 5,371,497 A | 12/1994 | Nimura et al. | |
| 5,396,430 A | 3/1995 | Arakawa et al. | |
| 5,410,486 A | 4/1995 | Kishi | |
| 5,422,815 A | 6/1995 | Hijikata | |
| 5,424,953 A | 6/1995 | Masumoto et al. | |
| 5,442,559 A | 8/1995 | Kuwahara et al. | |
| 5,452,212 A | 9/1995 | Yokoyama et al. | |
| 5,452,217 A | 9/1995 | Kishi | |
| 5,463,554 A | 10/1995 | Araki et al. | |
| 5,475,599 A | 12/1995 | Yokoyama | |
| 5,506,578 A | 4/1996 | Kishi | |
| 5,506,774 A | 4/1996 | Nobe et al. | |
| 5,528,248 A | 6/1996 | Steiner et al. | |
| 5,537,323 A | 7/1996 | Schulte | |
| 5,537,324 A | 7/1996 | Nimura et al. | |
| 5,546,107 A | 8/1996 | Deretsky et al. | |
| 5,559,511 A | 9/1996 | Ito et al. | |
| 5,638,279 A | 6/1997 | Kishi et al. | |
| 5,652,706 A | 7/1997 | Morimoto et al. | |
| 5,657,231 A | 8/1997 | Nobe et al. | |
| 5,712,788 A | 1/1998 | Liaw et al. | |
| 5,729,109 A | 3/1998 | Kaneko et al. | |
| 5,729,458 A | 3/1998 | Poppen | |
| 5,739,772 A | 4/1998 | Nanba et al. | |
| 5,742,925 A | 4/1998 | Baba | |
| 5,757,289 A | 5/1998 | Nimura et al. | |
| 5,774,073 A | 6/1998 | Maekawa et al. | |
| 5,787,383 A | 7/1998 | Moroto et al. | |
| 5,793,631 A | 8/1998 | Ito | |
| 5,809,447 A | 9/1998 | Kato | |
| 5,821,887 A | 10/1998 | Zhu | |
| 5,845,282 A | 12/1998 | Alley et al. | |
| 5,852,791 A | 12/1998 | Sato et al. | |
| 5,857,196 A | 1/1999 | Angle et al. | |
| 5,862,511 A | 1/1999 | Croyle et al. | |
| 5,874,905 A | 2/1999 | Nanba et al. | |
| 5,877,751 A | 3/1999 | Kanemitsu et al. | |
| 5,878,368 A | 3/1999 | DeGraaf | |
| 5,890,092 A | 3/1999 | Kato et al. | |
| 5,893,081 A | 4/1999 | Poppen | |
| 5,902,349 A | 5/1999 | Endo et al. | |
| 5,911,773 A * | 6/1999 | Mutsuga et al. | 701/200 |
| 5,925,090 A | 7/1999 | Poonsaengsathit | |
| 5,926,118 A | 7/1999 | Hayashida et al. | |
| 5,938,721 A | 8/1999 | Dussell et al. | |
| 5,946,687 A | 8/1999 | Gehani et al. | |
| 5,946,692 A | 8/1999 | Faloutsos et al. | |
| 5,948,043 A | 9/1999 | Mathis | |
| 5,951,622 A | 9/1999 | Nomura | |
| 5,953,722 A | 9/1999 | Lampert et al. | |
| 5,977,885 A | 11/1999 | Watanabe | |
| 5,978,730 A | 11/1999 | Poppen et al. | |
| 5,995,970 A | 11/1999 | Robinson et al. | |
| 6,021,406 A | 2/2000 | Kuznetsov | |
| 6,023,655 A | 2/2000 | Nomura | |
| 6,035,299 A | 3/2000 | White et al. | |
| 6,038,509 A | 3/2000 | Poppen et al. | |
| 6,038,559 A | 3/2000 | Ashby et al. | |
| 6,040,824 A | 3/2000 | Maekawa et al. | |
| 6,047,280 A | 4/2000 | Ashby et al. | |
| 6,052,645 A | 4/2000 | Harada | |
| 6,061,003 A | 5/2000 | Harada | |
| 6,061,630 A | 5/2000 | Walgers et al. | |
| 6,073,076 A | 6/2000 | Crowley et al. | |
| 6,076,041 A | 6/2000 | Watanabe | |
| 6,081,803 A | 6/2000 | Ashby et al. | |
| 6,088,652 A | 7/2000 | Abe | |
| 6,101,443 A | 8/2000 | Kato et al. | |
| 6,108,603 A | 8/2000 | Karunanidhi | |
| 6,112,153 A | 8/2000 | Schaaf et al. | |
| 6,112,200 A | 8/2000 | Livshutz et al. | |
| 6,119,066 A | 9/2000 | Sugiura et al. | |
| 6,121,314 A | 9/2000 | Richter et al. | |
| 6,121,900 A | 9/2000 | Takishita | |
| 6,122,593 A | 9/2000 | Friederich et al. | |
| 6,128,515 A | 10/2000 | Kabler et al. | |
| 6,128,573 A | 10/2000 | Nomura | |
| 6,134,501 A | 10/2000 | Oumi | |
| 6,151,552 A | 11/2000 | Koizumi et al. | |
| 6,161,092 A | 12/2000 | Latshaw | |
| 6,169,956 B1 | 1/2001 | Morimoto et al. | |
| 6,172,641 B1 | 1/2001 | Millington | |
| 6,182,006 B1 | 1/2001 | Meek | |
| 6,182,010 B1 | 1/2001 | Berstis | |
| 6,184,823 B1 | 2/2001 | Smith et al. | |
| 6,192,314 B1 | 2/2001 | Khavakh et al. | |
| 6,199,013 B1 | 3/2001 | O'Shea | |
| 6,199,045 B1 | 3/2001 | Giniger et al. | |
| 6,202,024 B1 | 3/2001 | Yokoyama et al. | |
| 6,202,026 B1 | 3/2001 | Nimura et al. | |
| 6,219,457 B1 | 4/2001 | Potu | |
| 6,249,740 B1 | 6/2001 | Ito et al. | |
| 6,249,744 B1 | 6/2001 | Morita | |
| 6,256,351 B1 | 7/2001 | Hong | |
| 6,259,988 B1 | 7/2001 | Galkowski et al. | |
| 6,263,276 B1 | 7/2001 | Yokoyama et al. | |
| 6,263,277 B1 | 7/2001 | Tanimoto et al. | |
| 6,266,612 B1 | 7/2001 | Dussell et al. | |
| 6,266,615 B1 | 7/2001 | Jin | |
| 6,278,994 B1 | 8/2001 | Fuh et al. | |
| 6,285,950 B1 | 9/2001 | Tanimoto | |
| 6,285,951 B1 | 9/2001 | Gaskins et al. | |
| 6,292,743 B1 | 9/2001 | Pu et al. | |
| 6,298,303 B1 | 10/2001 | Khavakh et al. | |
| 6,298,305 B1 | 10/2001 | Kadaba et al. | |
| 6,307,573 B1 | 10/2001 | Barros | |
| 6,308,177 B1 | 10/2001 | Israni et al. | |
| 6,314,365 B1 | 11/2001 | Smith | |
| 6,317,684 B1 | 11/2001 | Roeseler et al. | |
| 6,317,687 B1 | 11/2001 | Morimoto et al. | |
| 6,321,158 B1 | 11/2001 | DeLorme et al. | |
| 6,324,467 B1 | 11/2001 | Machii et al. | |
| 6,349,257 B1 | 2/2002 | Liu et al. | |
| 6,374,177 B1 | 4/2002 | Lee et al. | |
| 6,374,179 B1 | 4/2002 | Smith et al. | |
| 6,381,535 B1 | 4/2002 | Durocher et al. | |
| 6,388,877 B1 | 5/2002 | Canova, Jr. et al. | |
| 6,393,149 B2 | 5/2002 | Friederich et al. | |
| 6,401,034 B1 | 6/2002 | Kaplan et al. | |
| 6,401,035 B2 | 6/2002 | Jin | |
| 6,405,123 B1 | 6/2002 | Rennard et al. | |
| 6,411,899 B2 | 6/2002 | Dussell et al. | |
| 6,427,119 B1 | 7/2002 | Stefan et al. | |
| 6,430,498 B1 | 8/2002 | Maruyama et al. | |
| 6,456,234 B1 | 9/2002 | Johnson | |
| 6,460,046 B1 | 10/2002 | Meek | |
| 6,477,526 B2 | 11/2002 | Hayashi et al. | |
| 6,484,093 B1 | 11/2002 | Ito et al. | |
| 6,504,496 B1 | 1/2003 | Mesarovic et al. | |
| 6,505,123 B1 | 1/2003 | Root et al. | |
| 6,510,379 B1 | 1/2003 | Hasegawa et al. | |
| 6,512,525 B1 | 1/2003 | Capps et al. | |
| 6,522,875 B1 | 2/2003 | Dowling et al. | |
| 6,526,351 B2 | 2/2003 | Whitham | |
| 6,532,152 B1 | 3/2003 | White et al. | |
| 6,535,743 B1 | 3/2003 | Kennedy et al. | |

| | | |
|---|---|---|
| 6,542,814 B2 | 4/2003 | Polidi et al. |
| 6,563,440 B1 | 5/2003 | Kangas |
| 6,567,743 B1 | 5/2003 | Mueller et al. |
| 6,574,553 B1 | 6/2003 | Beesley et al. |
| 6,574,554 B1 | 6/2003 | Beesley et al. |
| 6,581,003 B1 | 6/2003 | Childs et al. |
| 6,594,666 B1 | 7/2003 | Biswas et al. |
| 6,615,130 B2 | 9/2003 | Myr |
| 6,615,131 B1 | 9/2003 | Rennard et al. |
| 6,633,809 B1 | 10/2003 | Aizono et al. |
| 6,650,996 B1 | 11/2003 | Beesley et al. |
| 6,674,849 B1 | 1/2004 | Froeberg |
| 6,675,093 B1 | 1/2004 | Childs et al. |
| 6,687,615 B1 * | 2/2004 | Krull et al. ................. 701/210 |
| 6,694,256 B1 | 2/2004 | Childs et al. |
| 6,704,645 B1 | 3/2004 | Beesley et al. |
| 6,708,112 B1 | 3/2004 | Beesley et al. |
| 6,725,155 B1 | 4/2004 | Takahashi et al. |
| 6,768,942 B1 | 7/2004 | Chojnacki |
| 6,775,612 B1 | 8/2004 | Kao et al. |
| 6,782,318 B1 | 8/2004 | Beesley et al. |
| 6,789,012 B1 | 9/2004 | Childs et al. |
| 6,799,115 B1 | 9/2004 | Childs et al. |
| 6,807,483 B1 | 10/2004 | Chao et al. |
| 6,823,256 B1 | 11/2004 | Burt |
| 6,834,230 B1 | 12/2004 | Childs et al. |
| 6,839,624 B1 | 1/2005 | Beesley et al. |
| 6,845,322 B1 | 1/2005 | Chao et al. |
| 6,847,890 B1 | 1/2005 | Childs et al. |
| 6,850,842 B2 | 2/2005 | Park |
| 6,856,893 B2 | 2/2005 | Beesley et al. |
| 6,856,900 B1 | 2/2005 | Childs et al. |
| 6,889,138 B1 | 5/2005 | Krull et al. |
| 6,892,135 B1 | 5/2005 | Krull et al. |
| 6,898,520 B2 | 5/2005 | Kao et al. |
| 6,975,940 B1 | 12/2005 | Childs et al. |
| 6,980,906 B2 | 12/2005 | Kao et al. |
| 6,999,873 B1 * | 2/2006 | Krull et al. ................. 701/210 |
| 7,120,539 B2 * | 10/2006 | Krull et al. ................. 701/210 |
| 2001/0043745 A1 | 11/2001 | Fredrich et al. |
| 2001/0045949 A1 | 11/2001 | Chithambaram et al. |
| 2001/0056327 A1 | 12/2001 | Jin |
| 2002/0038316 A1 | 3/2002 | Onyon et al. |
| 2002/0040271 A1 | 4/2002 | Park et al. |
| 2002/0091527 A1 | 7/2002 | Shiau |
| 2002/0102988 A1 | 8/2002 | Myllymaki |
| 2002/0120753 A1 | 8/2002 | Levanon et al. |
| 2002/0164998 A1 | 11/2002 | Younis |
| 2002/0173905 A1 | 11/2002 | Jin |
| 2003/0006913 A1 | 1/2003 | Joyce et al. |
| 2003/0006918 A1 | 1/2003 | Barnett |
| 2003/0013483 A1 | 1/2003 | Ausems et al. |
| 2003/0045301 A1 | 3/2003 | Wollrab |
| 2003/0045998 A1 | 3/2003 | Medl |
| 2003/0048599 A1 | 3/2003 | Martin |
| 2003/0069029 A1 | 4/2003 | Dowling et al. |
| 2003/0069899 A1 | 4/2003 | Brown et al. |
| 2003/0105845 A1 | 6/2003 | Leermakers |
| 2003/0131023 A1 | 7/2003 | Bassett et al. |
| 2003/0131059 A1 | 7/2003 | Brown et al. |
| 2003/0139150 A1 | 7/2003 | Rodriguez et al. |
| 2004/0220726 A1 | 11/2004 | Jin |

FOREIGN PATENT DOCUMENTS

| | | |
|---|---|---|
| CN | 1391687 T | 10/2003 |
| EP | 0061674 | 6/1982 |
| EP | 0123562 | 4/1984 |
| EP | 0242099 | 10/1987 |
| FR | 2541801 | 2/1983 |
| FR | 2818414 | 6/2002 |
| JP | 08-221694 | 8/1996 |
| JP | 10-132594 | 5/1998 |
| WO | 01/23839 | 4/2001 |
| WO | 02/060157 | 11/2003 |
| WO | 01/61276 | 3/2004 |
| WO | 02/103291 | 3/2004 |
| WO | 03/058170 | 10/2004 |

OTHER PUBLICATIONS

U.S. Appl. No. 10/088,370, filed Feb. 18, 2002, Childs et al.
U.S. Appl. No. 10/269,573, filed Oct. 11, 2002, Childs et al.
U.S. Appl. No. 10/962,700, filed Oct. 12, 2004, Childs et al.
U.S. Appl. No. 10/976,998, filed Oct. 29, 2004, Childs et al.
U.S. Appl. No. 10/993,174, filed Nov. 19, 2004, Krull et al.
U.S. Appl. No. 10/993,189, filed Nov. 19, 2004, Childs et al.
U.S. Appl. No. 11/035,242, filed Jan. 13, 2005, Beesley et al.
U.S. Appl. No. 11/035,243, filed Nov. 5, 2003, Krull et al.
"An optimal pathfinder for vehicles in real-world digital terrain maps", http://www.nease.net/jamsoft/shortestpath/pathfinder/4.html, 11 pages, (1999).
"Informed Search Methods", Artificial Intelligence, A Modern Approach, Prentice Hall, Inc., pp. 92-115, (1995).
"Real-Time Vehicle Routing in Dynamic and Stochastic Urban Traffic Networks", http://www.gpu.srv.ualberta.ca/lfu/research.htm. pp. 1-3, (1997).
Ahuja, R., et al., "Faster Algorithms for the Shortest Path Problem", Journal of the Association for Computing Machinery, 37(2), pp. 213-223, (1990).
Booten, A., "The Automatic Position Reporting System", http://www.oarc.net/aprs.htm, 5pages, (2002).
Bourrie, S. "Tendler Updates FoneFinder", Wireless Week, p. 24, Jun. 28, 1999.
Bravman, J.S. et al., "Automatic Vehicle Monitoring", 10 pages.
Chung et al.; Level-Compressed Huffman Decoding; IEEE-Transactions on Communication; Oct. 1999; vol. 47, No. 10; pp. 1455-1457.
Cung v., et al. "An Efficient Implementation of Parallel A*", CFPAR, Montreal, Canada, pp. 153-167, (1994).
Fredman, M., et al., "Fibonacci heaps and their uses in improved network optimization algorithms", Journal of the ACM, 34(3), 2 pages, (1987).
Fu, L., "Heuristic Shortest Path Algorithms and their Potential IVHS Applications", Proceedings of the Fourth University of Alberta—University of Calgary, Joint Graduate Student Symposium in Transportation Engineering, pp. 83-109, (1995).
Ikeda, T., et al., "A Fast Algorithm for Finding Better Routes by AI Search Techniques", Vehicle Navigation and Information Systems Conference Proceedings, pp. 291-296, (1994).
Kaindl, H., et al., "Memory-Bounded Bidirectional Search", Proceedings of the 12th National Conference on Art, AAAI press, Seattle, WA, pp. 1359-1364, (1994).
Laporte, G., "The Vehicle Routing Problem: An overview of exact and approximate algorithms", European Journal of Operational Research, 59, pp. 345-358, (1992).
Microsoft Press Computer Dictionary, Third Edition, Microsoft Press, p. 281 (1997).
Myers, B., "Data Structures for Best-First Search", http://www4.ncsu.edu/jbmyers/dsai.htm, pp. 1-6, (1997).
Nekritch, Y., Byte-oriented decoding of canonical Huffman codes; IEEE-Information Theory 2000; Jun. 2000; p. 371.
Nilsen, P., "Application of the Global-Positioning System (GPS) to Automatic Vehicle Monitoring", 1981 Camahan Conference on Crime Countermeasures, Univeristy of Kentucky, pp. 7-11, (1981).
Oberhauser et al.; Fast data structures for shortest path routing: a comparative evaluation; 1995 IEEE International Conference on Gateway to Globalization; Jun. 1995; vol. 3, pp. 1597-1601.
Ronngren, R., et al., "Parallel and Sequential Priority Queue Algorithms", ACM Transactions on Modelling and Computer Simulation, 7 (2), pp. 168-172, 198, 199, (1997).
Rosenberg, J. M. Dictionary of Computers, Information Processing and Telecommunications, Second Edition, Aug. 1990.

Sout, B., "Smart Moves: Intelligent Pathfinding", Gamasutra, http://www.gamasutra.com/features/programming/080197/pathfinding.htm, pp. 1-11, (1997).

Wai, L., et al., "Comparative Study of Shortest Path Algorithm for Transport Network", USRP Report 2, http://www.comp.nus.edu.sg/,leonghoe/USRPreport-txt.html, pp. 1-10, (1999).

Zhan, F.B., "Three Fastest Shortest Path Algorithms on Real Road Networks: Data Structures and Procedures", Journal of Geographic Information and Decision Analysis, 1 (1), http://www.geog.uwo.ca/gimda/journal/vol.1.1/Zhan/Zhan.htm, 11 pages, (1997).

Zhao, Y., et al., "An Adaptive Route-Guidance Algorithm for Intelligent Vehicle Highway Systems", American Control Conference, Boston, MA, Department of Electrical Engineering and Computer Science, The University of Michigan, pp. 2568-2573, (1991).

* cited by examiner

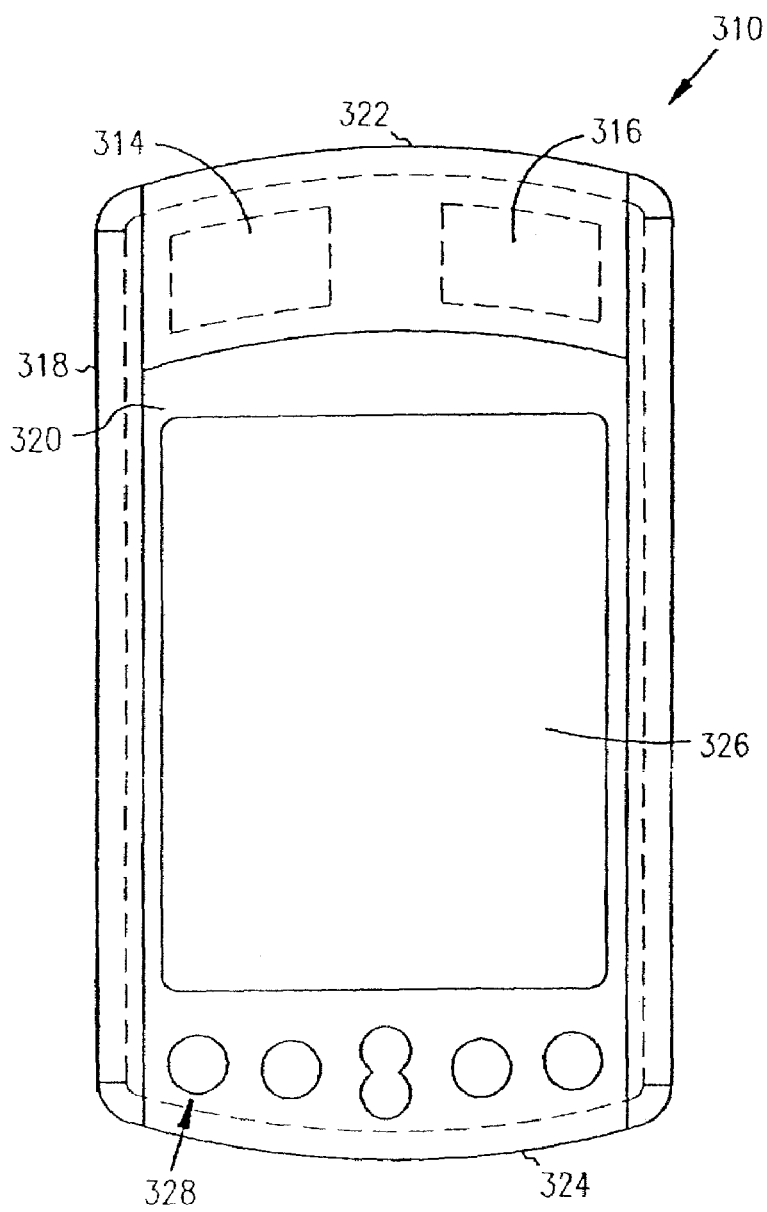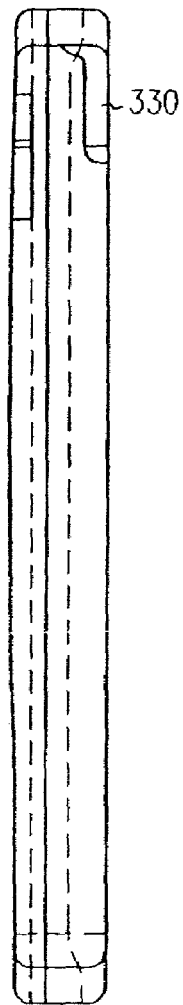
FIG. 3A  FIG. 3B
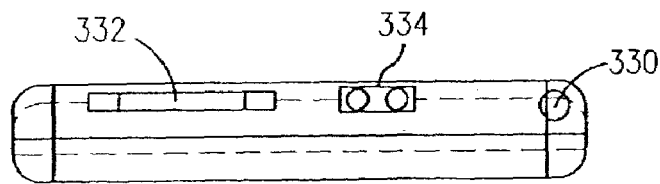
FIG. 3C

NAVIGATION SYSTEM, METHOD AND DEVICE WITH DETOUR ALGORITHM

CROSS REFERENCE TO RELATED APPLICATIONS

This application is a divisional and claims priority benefit of U.S. patent application Ser. No. 11/035,243, filed Jan. 13, 2005, which is a divisional and claims priority benefit of U.S. patent application Ser. No. 10/701,771, filed Nov. 5, 2003, now U.S. Pat. No. 6,999,873, which is a continuation and claimed priority benefit of U.S. patent application Ser. No. 10/028,343, filed Dec. 21, 2001, now U.S. Pat. No. 6,687,615. Thus, this application claims priority benefit of U.S. Pat. No. 6,687,615. The above-identified applications are hereby incorporated by reference.

FIELD OF THE INVENTION

The present invention relates generally to navigational devices, and in particular to navigational devices with detour route calculation capabilities.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability involves detour route calculation capabilities. Many conventional navigational devices simply do not incorporate a detour route calculation functionality in order to reduce system complexity and maintain a low overall system cost. Some of these devices may alert the user that they are off course when the user makes a detour, but they do not perform any course or route recalculation to accommodate for the intended or unintended detour in route. The intended or unintended detour can be for reasons such as thoroughfare conditions, thoroughfare congestion (e.g. rush hour or road construction), check point delays and the like. Some navigational devices include functionality which allows the device to calculate a new route based on an in route decision to avoid one or more thoroughfares, or sections, of a planned route. However, these devices require the user to point to, highlight, or draw a box around the segment which the user wants to avoid. That is, the decision to calculate a new route is not dynamically tied to the current route on which the user is traveling. Requiring the user to point to, highlight, or draw a box around the segment which the user wants to avoid is also distracting to do while the user is driving or trying to navigate the route.

In conventional navigational methods and devices the user may have to halt their journey in an attempt to decide upon a new route, or course, and must rely on traditional navigational methods, e.g. asking directions, following detour signs (in the case of a forced detour) or using a conventional map. In some devices, the user may still be able to see the previously planned route, but they will have to employ their own decision making to chart themselves around that portion of the previous route they want to avoid and yet still be headed toward a desired destination. This can be time consuming and provide frustration to a user who is likely unfamiliar with the routes surrounding their current location.

Clearly, in many cases halting travel to decide upon a new route is not a viable alternative. For example, when the user is traveling on an interstate it is entirely impossible to simply stop. The alternative of pulling off on the shoulder is undesirable and can be dangerous. Stopping travel is equally undesirable since doing so increases travel time and provides an added inconvenience to the user. In other instances, such as navigating downtown city streets, the traffic issues alone may prevent the user from stopping their vehicle to decide upon a new route. As mentioned above, even if the user has the ability to safely stop their vehicle, such as when traveling in a neighborhood, the inconvenience factor is present.

Another problem is that when a device is used to perform a new route calculation from a new position (off of the originally planned route) to a desired destination, the calculation is not going to take into account the reason for the intended or unintended detour. As a result, the new route calculation will often provide a route which includes travel on the thoroughfare from which the detour was taken. Thus, the new route does not provide any solution to the need for avoiding the thoroughfare from which the detour was taken. As the reader will appreciate the intended or unintended detour may be for reasons of traffic congestion, road construction, the type of thoroughfare, and the like.

In summary, current prior art systems have created a spectrum of products in which the degree of navigational accuracy is dictated primarily by the cost of the system. The lower cost systems currently offer a low degree of accuracy and functionality that is often inadequate for users. Therefore, there exists a need for a navigational route planning device which is more efficient and accurate than current low cost systems, without requiring more expensive system resources. In addition, there is also a need for a navigational route planning device which provides a user with more dynamic route calculation capabilities.

SUMMARY OF THE INVENTION

The above mentioned problems with navigational devices, as well as other problems, are addressed by the present invention and will be understood by reading and studying the following specification. Systems and methods are provided for a navigational route planning device which is more user intuitive, efficient, timely, and accurate than current low cost systems, without requiring the more expensive system resources. The systems and methods of the present invention offer an improved navigational route planning device which provides a user with more dynamic route calculation capabilities.

In one embodiment of the present invention, an electronic navigational aid device with improved route calculation capabilities is provided. The navigational aid device includes a processor with a display connected to the processor. A memory is connected to the processor as well. The memory includes cartographic data and a route to a desired destination stored therein. The cartographic data includes data indicative of thoroughfares of a plurality of types. The device processes travel along the route. The device is capable of selecting a detour around one or more portions of a thoroughfare, a group of thoroughfares, or one or more sections in a network of thoroughfares. The device calculates a new route to navigate to the desired destination. In order to calculate the new route, the device performs a route cost analysis.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device according to the teachings of the present invention;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having route calculation capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
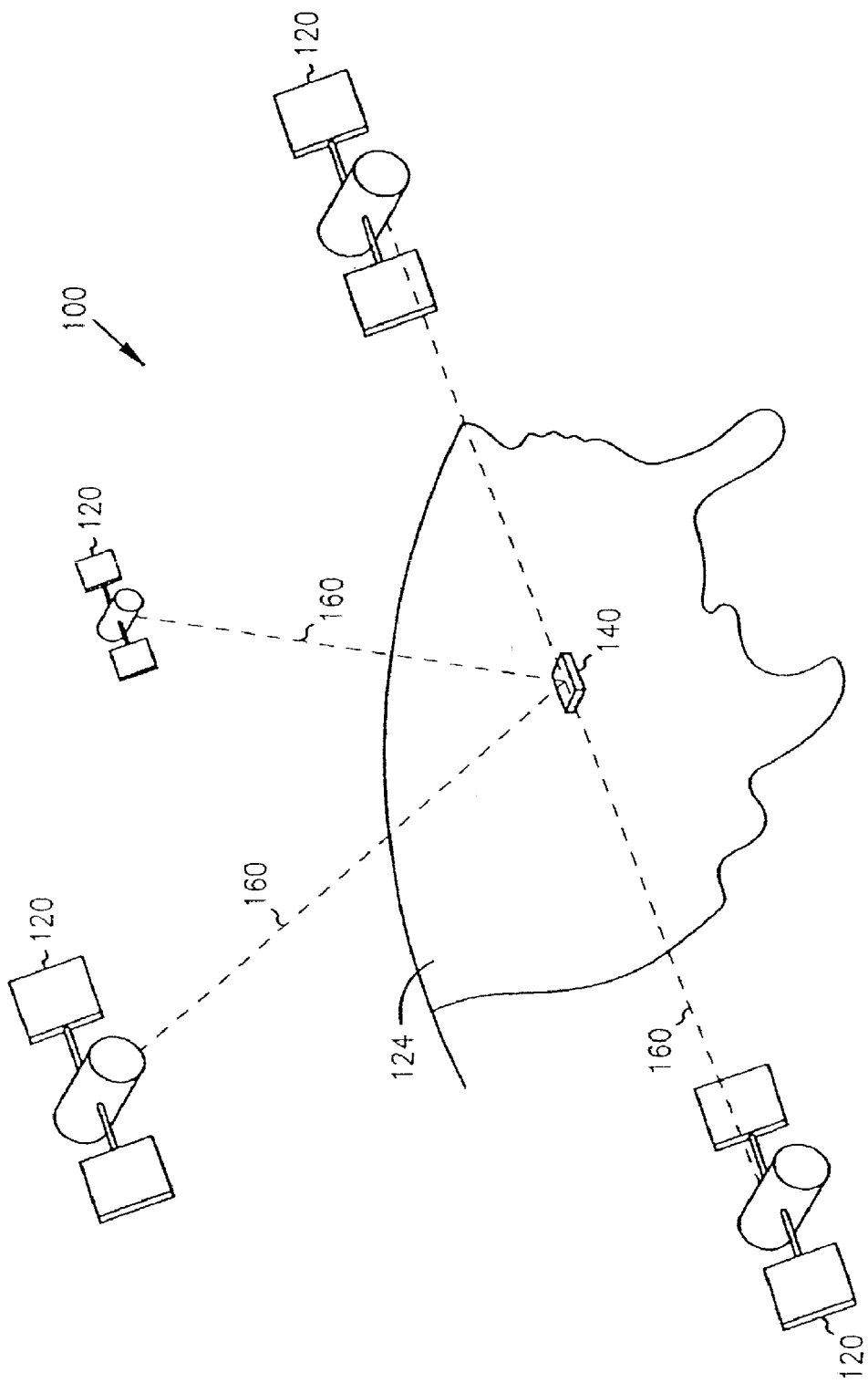
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
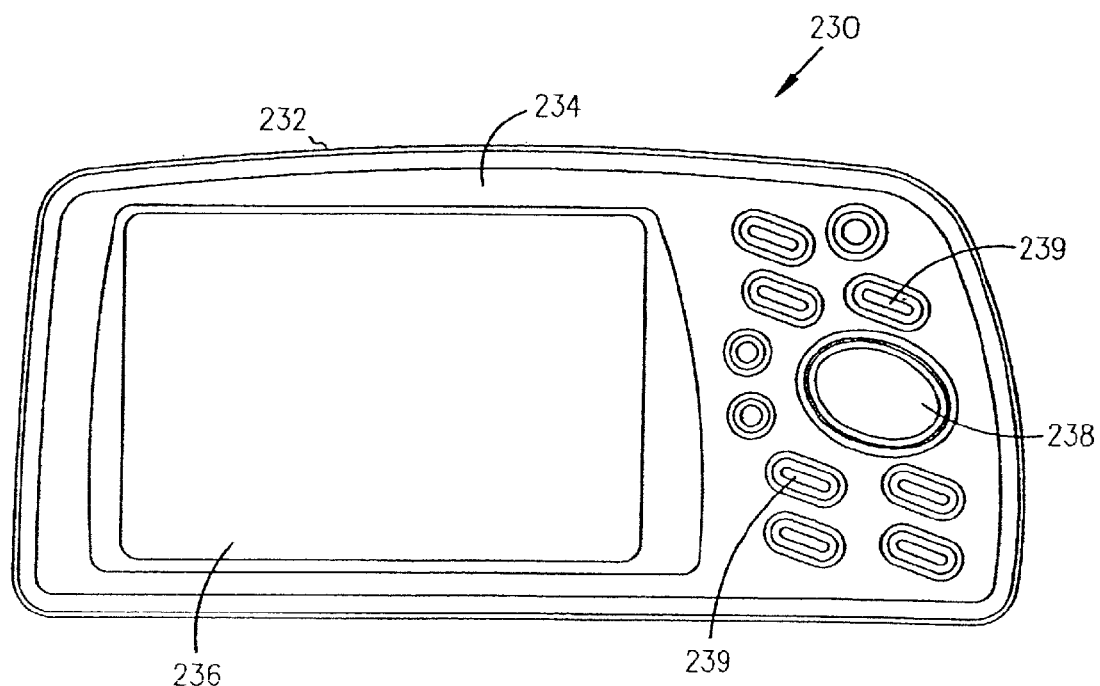
FIGS. 2A and 2B illustrate views for one embodiment of an electronic navigational device according to the teachings of the present invention.
Figure 2B:
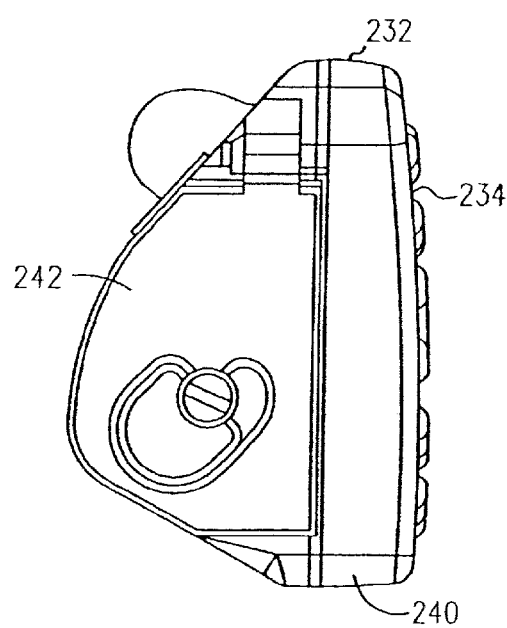

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
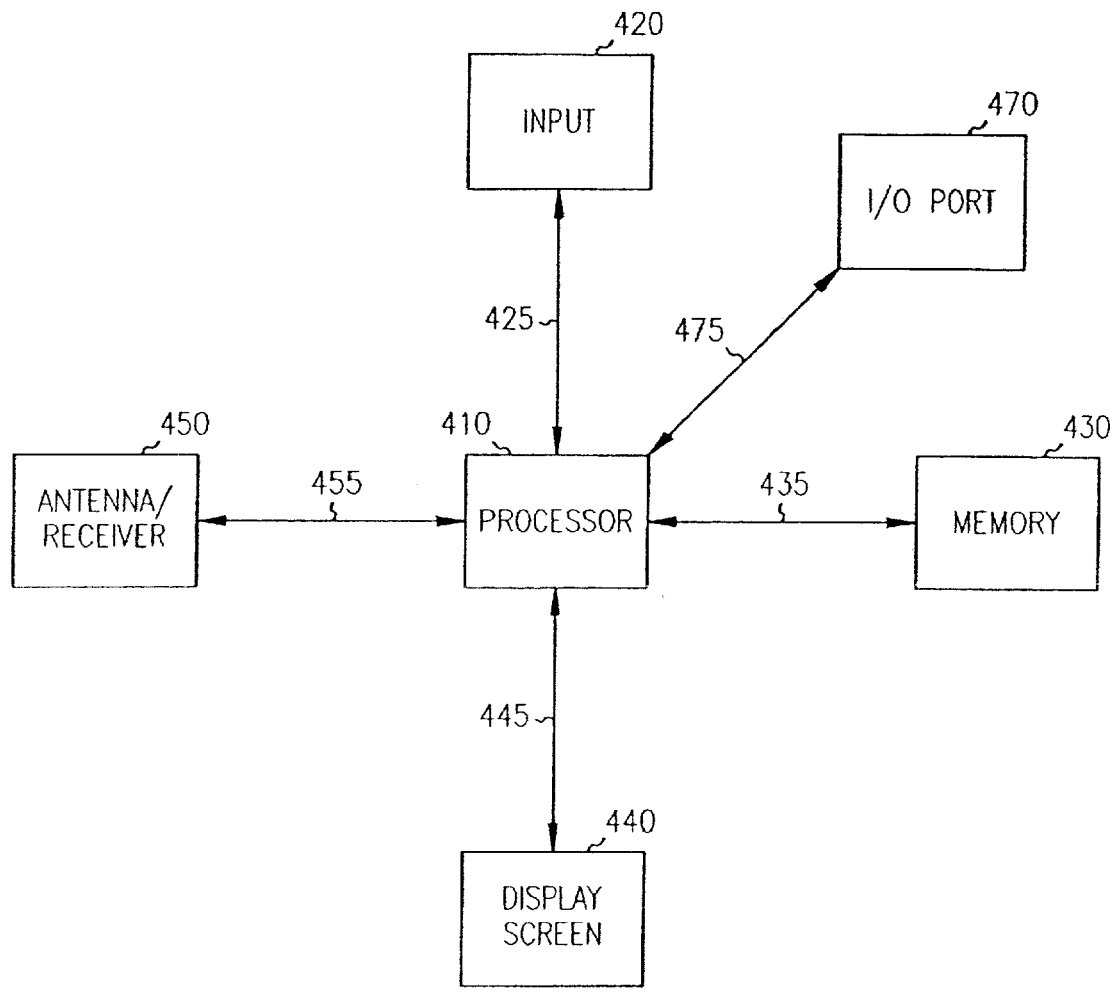
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
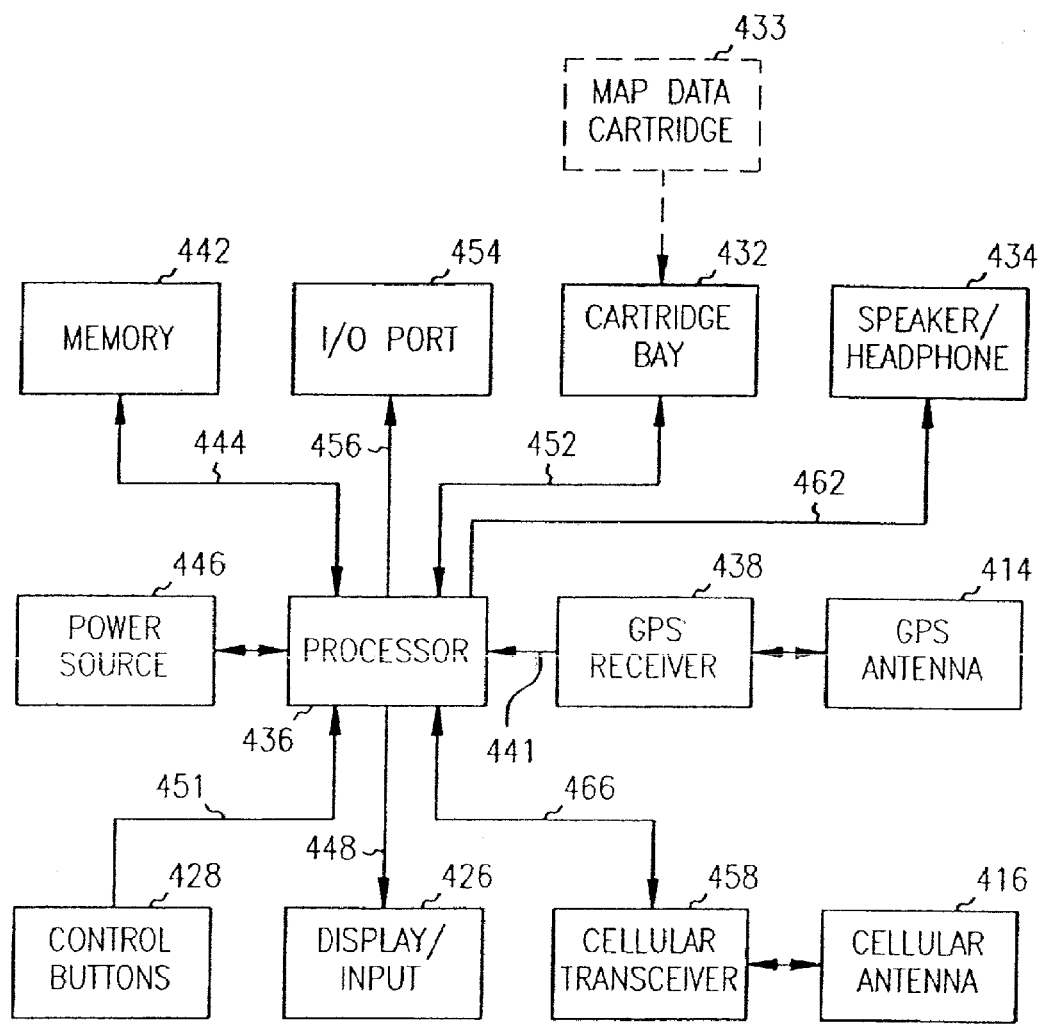
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Using the processing algorithms of the present invention, the device is capable of dynamically selecting a detour around one or more portions of a thoroughfare, a group of thoroughfares, or one or more sections in a network of thoroughfares. The device calculates a new route to navigate to the desired destination. In order to calculate the new route, the device performs a route cost analysis. The device then uses those electronic components to calculate a new route to navigate to the desired destination. According to the teachings of the present invention, the device incorporates these and other functions as will be explained in more detail below in connection with FIGS. 6 and 7.

Figure 5:
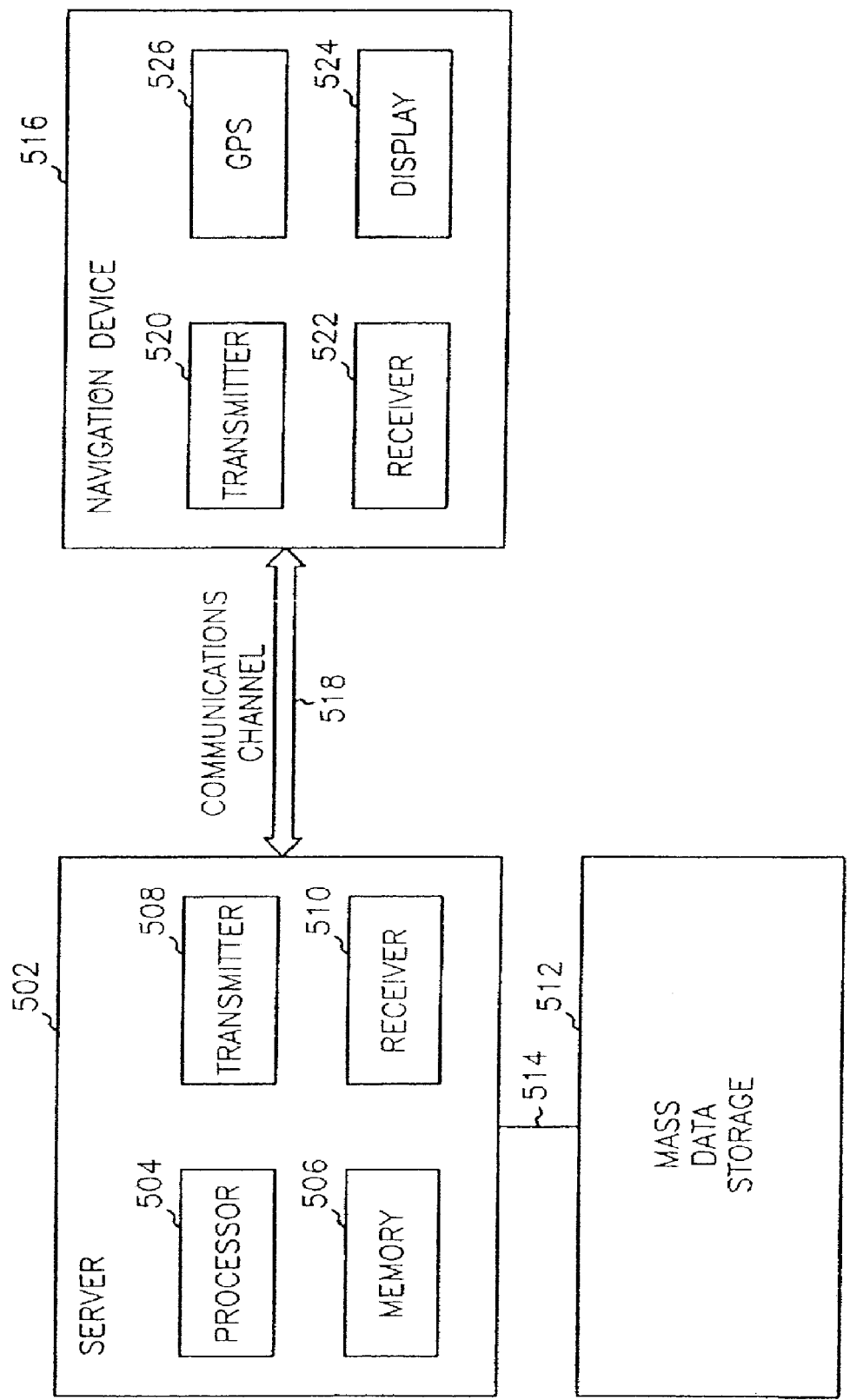
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 518 is capable of accommodating wireless communication such as radio frequency, microwave frequency and infrared communication, and the like. Additionally, according to various embodiments, the communication channel 518 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIGS. 4A and 4B.

That is, the navigational system 500 of FIG. 5 is likewise adapted to provide an electronic navigational aid device 516 with improved, dynamic route calculation capabilities. In this embodiment, the processor 504 in the server 502 is used to handle the bulk of the system's processing needs. The mass storage device 512 connected to the server can include volumes more cartographic and route data than that which is able to be maintained on the navigational device 516 itself. In this embodiment, the server 502 processes the majority of a device's travel along the route using a set of processing algorithms and the cartographic and route data stored in memory 512 and can operate on signals, e.g. GPS signals, originally received by the navigational device 516. Similar to the navigational device of FIGS. 4A and 4B, the navigation device 516 in system 500 is outfitted with a display 524 and GPS capabilities 526.

As described and explained in detail in connection with FIGS. 4A and 4B, the navigation system of FIG. 5 uses processing algorithms. In the invention, the device is capable of selecting a detour with a preference for avoiding one or more portions of a thoroughfare, a group of thoroughfares, or one or more sections in a network of thoroughfares. The device calculates a new route to navigate to the desired destination. In order to calculate the new route, the device performs a route cost analysis. The system uses the processing algorithms and the electronic components shown in FIG. 5 to calculate a new route for navigating the device 516 to the desired destination. As one of ordinary skill in the art will understand upon reading and comprehending this disclosure, a user of the navigation device 516 can be proximate to or accompanying the navigation device 516. The invention however, is not so limited.

According to the teachings of the present invention, the device is capable of selecting a detour around one or more portions of a thoroughfare, a group of thoroughfares, or one or more sections in a network of thoroughfares. The device calculates a new route to navigate to the desired destination. In order to calculate the new route, the device performs a route cost analysis. In one embodiment, based on the route cost analysis, the new route avoids the one or more portions of a thoroughfare, a group of thoroughfares, or one or more sections in a network of thoroughfares. In one embodiment, based on the route cost analysis, the new route at least partially avoids the one or more portions of a thoroughfare, a group of thoroughfares, or one or more sections in a network of thoroughfares. In still another embodiment, based on the route cost analysis, the new route does not avoid the one or more portions of a thoroughfare, a group of thoroughfares, or one or more sections in a network of thoroughfares. The navigation device 516 of the present invention includes a portable electronic navigational aid device. In one embodiment, the portable electronic navigational aid device includes a personal digital assistant (PDA). In one embodiment, the portable electronic navigational aid device includes a wireless communications device.

The features and functionality explained and described in detail above in connection with the device of FIGS. 4A and 4B are likewise available in the system 500 of FIG. 5. That is, in one embodiment the navigation device 516 further provides audio and visual cues to aid the navigation along the route.

Figure 6:
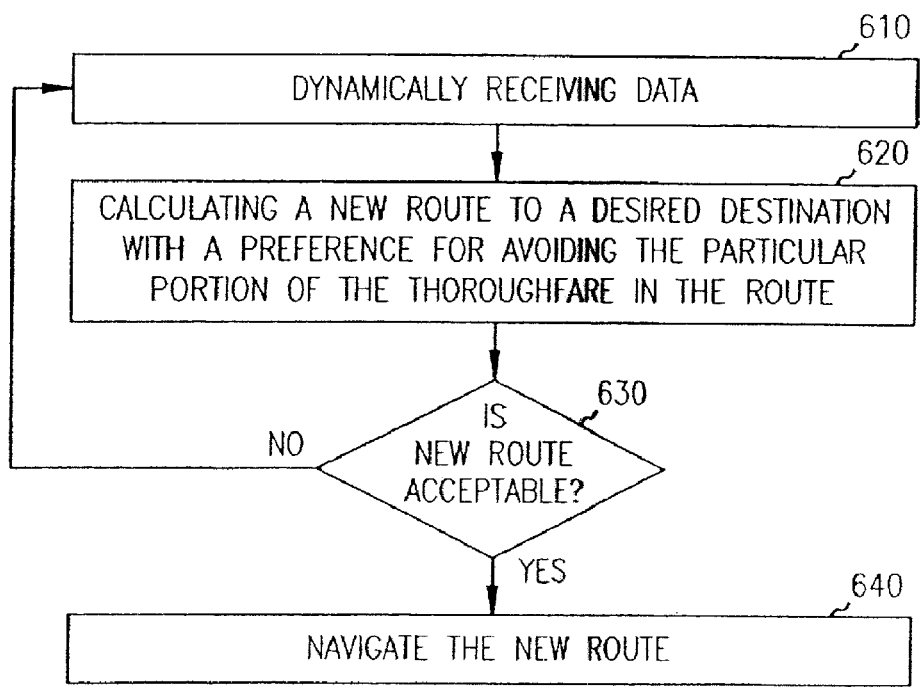
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for performing a route calculation within a navigation device or navigation system as described and explained in detail above in connection with FIGS. 4A, 4B, and 5. And, as described above, a processor is used for processing signals which include input data from input devices, e.g. keypads or other input keys, GPS signals from GPS components, and data received from I/O ports in order to perform the methods described herein. In the embodiment shown in FIG. 6, the navigation aid method for performing a route calculation includes dynamically receiving data in block 610. In one embodiment, as shown in FIG. 6, dynamically receiving data 610 includes dynamically receiving data relating to a portion of a particular thoroughfare in a route. In the embodiment shown in FIG. 6, the method includes calculating a new route to a desired destination with a preference for avoiding the particular portion of the thoroughfare in the route in block 620. In one embodiment, the method further includes performing a route cost analysis in order to calculate the new route to the desired destination. And, in one embodiment, the method further includes displaying the new route.

As one of ordinary skill in the art will understand upon reading this disclosure, in some embodiments the new route, based on a performed route cost analysis, avoids the particular portion of the thoroughfare in the route. In some embodiments, the new route, based on a performed route cost analysis, partially avoids the particular portion of the thoroughfare in the route. And, in some embodiments, the new route, based on a performed route cost analysis, does not avoid the particular portion of the thoroughfare in the route.

As shown in block 630 of FIG. 6, the method includes a determination of whether the new route is acceptable. As one of ordinary skill in the art will appreciate upon reading this disclosure, the determination of whether the new route is acceptable can be based upon additionally received dynamic data. By way of example and not by way of limitation, the additionally received dynamic data can include dynamic data input by a user of the device indicating that the user is not satisfied with the new route in which case the method returns to block 610 to dynamically receive data. In one embodiment, the additionally received dynamic input can include instructions to calculate yet another new route using additional data for avoiding a portion of a thoroughfare in a previous route, one or more thoroughfares in the previous route, and/or one or more sections in the previous route. As used herein, the previous route can include a previous detour route and/or an earlier planned route. Additionally, the additionally received dynamic input can include instructions to continue navigating an original route and/or previously planned route.

As one of ordinary skill in the art will appreciate upon reading and understanding this disclosure the method sequence shown in blocks 610–630 can be repeated as many times as necessary, without limitation, in order to achieve a desired route. According to one embodiment of the teachings of the present invention, all of the dynamically received data is stored in the memory of the device and is operable upon each time the sequence in blocks 610–630 is repeated. Thus, the present invention provides a system, device and method by which information received between re-route, new route, or detour route calculations is maintained.

As shown in FIG. 6, if the new route is acceptable, or once a desired route is attained, then the method proceeds to block 640 and navigates the new route.

In one embodiment according to the teachings of the present invention, the method for calculating a new route in block 620 to a desired destination includes calculating a second new route different from a first new route, wherein the first new route is a first detour route. And, calculating the second new route includes calculating the second new route with a preference for avoiding a particular portion of a thoroughfare in the first detour route and the particular portion of the thoroughfare in the route. One of ordinary skill in the art will appreciate upon reading and understanding this disclosure that other variations on the above scenario are included within the scope of the present invention. That is, calculating the second new route can include calculating the second new route with a preference for avoiding one or more thoroughfares in any previous route, and/or one or more sections in any previous route.

Thus, as one of ordinary skill in the art will understand upon reading this disclosure, the present invention provides a method by which one or more detours, new route calculations, or re-route calculations can avoid generating a route which re-includes that portion, thoroughfare, or section of a route which is sought to be avoided.

According to one embodiment of the invention, dynamically receiving data relating to the portion of the particular thoroughfare in the route in block 610 includes dynamically receiving data defining a distance along the portion of the particular thoroughfare. In one embodiment, dynamically receiving data relating to the portion of the particular thoroughfare in the route in block 610 includes assigning a preference for avoiding the portion of the particular thoroughfare. In one embodiment, the dynamically received data includes data relating to a preference level for avoiding the portion of the particular thoroughfare. By way of example, this preference level data can include a high, medium, or low preference level which can be operated upon in a route cost analysis.

As mentioned above, in one embodiment the method further includes dynamically receiving data relating to one or more thoroughfares in the route and calculating a new route to a desired destination with a preference for avoiding the one or more thoroughfares in the route. In one embodiment, dynamically receiving data relating to one or more thoroughfares in the route includes dynamically receiving data relating to the group consisting of a thoroughfare name, a thoroughfare classification, and a thoroughfare type. As used herein, thoroughfare classification can include a speed classification, e.g. a 25, 55, or 75 mph speed classification. And as used herein, thoroughfare type can includes a designated thoroughfare type such as an interstate, county road, state road, state highway, and the like classification. The invention is not so limited.

Figure 7:
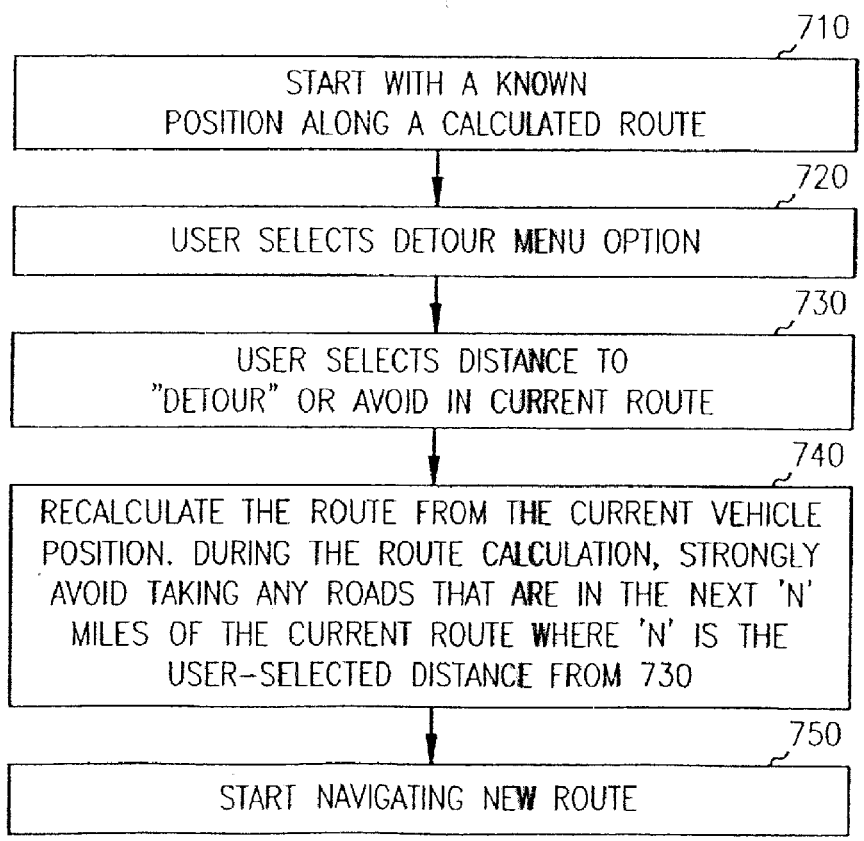
FIG. 7 is a flow diagram of another embodiment of a navigation aid method according to the teachings of the present invention.

FIG. 7 is a flow diagram of another embodiment of a navigation aid method according to the teachings of the present invention. As shown the embodiment of FIG. 7, the method begins in block 710 by determining a current position of the navigation device along a route. As one of ordinary skill in the art will understand upon reading this disclosure, determining or calculating a position of the navigation device is achieved in some embodiments using a GPS. The invention, however, is not so limited. It is further readily appreciated that the current position of the navigation device may be displayed on cartographic data and that the current position can be on a previously planned route.

In block 720, the method includes retrieving a re-route, new route, or detour route data structure based on input data. As one or ordinary skill in the art will understand upon reading this disclosure, one embodiment for retrieving a re-route, new route, or detour route data structure based on input data 710 can include receiving user input data which selects a re-route, new route, or detour route menu option.

In one embodiment, as shown in block 730 of FIG. 7, the method includes determining a distance to avoid for a particular portion of a thoroughfare in a route which is currently provided for the device. In one embodiment, determining a distance to avoid for a particular portion of a thoroughfare in a route which is currently provided for the device includes a user selecting a distance to avoid in a current route from among a number of options in a detour route menu. For example, determining a distance to avoid can include determining a distance from a number of integral distances, e.g. 1, 5, 10, and 20 miles. Likewise, determining a distance to avoid can include a user inputting a distance value. The invention, however, is not so limited. One of ordinary skill in the art will further understand that in some embodiments the method includes determining one or more thoroughfares to avoid in a route which is currently provided for the device, and/or determining one or more sections to avoid in a route which is currently provided for the device. As used herein, one or more sections can includes one or more portions of a thoroughfare, one or more portions of one thoroughfare and one or more portions of another thoroughfare, one or more portions of one thoroughfare and one or more other thoroughfares, or any combinations thereof for a route which is currently provided for the device. The invention is not so limited.

In block 740, the method includes calculating a new route based on the determination made in block 730. Thus, by way of example and not by way of limitation, the method embodiment shown in FIG. 7 includes calculating a new route in block 740 based on the device's determined position and the distance determined in block 730. However in other embodiments, calculating the new route can be performed based on the determined one or more thoroughfares and/or the determined one or more sections to avoid in a route which is currently provided for the device.

According to one embodiment of the present invention, calculating the new route in block 740 based on the determination made in block 730 includes dynamically calculating the new route based on the determination in block 730 and based on a route cost analysis. One of ordinary skill in the art will understand upon reading and understanding this disclosure, the manner in which a new route can be calculated using the determination made in block 730 and factoring that determination in to a route processing algorithm which performs a route cost analysis. That is, in one embodiment, such as that described in FIG. 7, the present invention is operable to perform a route calculation which strongly avoids the distance along a particular portion of a thoroughfare determined in block 730, or in other embodiments strongly avoids one or more particular thoroughfares and/or more sections in a route which is currently provided for the device.

In one embodiment, in order to achieve the above result, the method of the present invention assigns a greater cost to particular nodes in a network of thoroughfares based on the determination made in block 730. As used herein, every places two thoroughfares intersect is termed a node. Thus, every node on a given thoroughfare connects one thoroughfare to another thoroughfare, which can be referred to as an adjacency, or adjacent thoroughfare. The term adjacency information, or adjacencies, is intended to include any thoroughfare which intersects another thoroughfare in a network of thoroughfares which are available for use in a potential route. According to the teachings of the present invention adjacency criteria includes, but is not limited to, the degree of turn angles between one thoroughfare and another, connected by a node in a network of thoroughfares which are available for use in a potential route. The term adjacency can further include can information relating to the thoroughfare on which the device is located and adjacent thoroughfares connected thereto by a node, thoroughfare names, thoroughfare classifications, speed classification of the thoroughfares, and other criteria of the like.

As one of ordinary skill in the art will understand upon reading this disclosure, data representing the cost assigned to a given node between a given thoroughfare and an adjacency, as well as data representing adjacency criteria are used in performing a route cost analysis. Thus, in one embodiment of the present invention, assigning a greater cost to one or more particular nodes in a network of thoroughfares based on the determination made in block 730 reduces the likelihood of a given portion, thoroughfare, or section being chosen as part of the route from among the network of thoroughfares in cartographic data which are available for use in a potential route.

Finally, as shown in FIG. 7, once the new route has been calculate in block 740, the method proceeds to block 750 and navigates the new route. It is will readily be appreciated that the new route for the device can be navigated for the device according to the methods described herein. However, the invention is not limited to a single particular method of navigating the route in block 750.

In some embodiments, the methods provided above are implemented as a computer data signal embodied in a carrier wave or propagated signal, that represents a sequence of instructions which, when executed by a processor, such as processor 410 in FIGS. 4A and 4B or processor 504 in FIG. 5, cause the processor to perform the respective method. In other embodiments, methods provided above are implemented as a set of instructions contained on a computer-accessible medium, such as memory 430 in FIGS. 4A and 4B or mass storage device 512 in FIG. 5, capable of directing a processor, such as processor 410 in FIGS. 4A and 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device 400 shown in FIGS. 4A and 4B and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving accuracy, processor speed and ease of user interaction with a navigation device. That is, the systems, devices and methods provide for a navigational route planning device which is more efficient and accurate than current low cost systems, without requiring the more expensive system resources. The systems, devices and methods of the present invention offer an improved navigational route planning device which provide dynamic route calculation capabilities. The device is capable of selecting a detour around one or more portions of a thoroughfare, a group of thoroughfares, or one or more sections in a network of thoroughfares. Thus in instances where a thoroughfare may be less desirable for travel, such as for reasons which include accidents, thoroughfare conditions, thoroughfare types, checkpoints and the like, the device calculates a new route to navigate to the desired destination. In order to calculate the new route, the device performs a route cost analysis.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A navigation system with route calculation capabilities, comprising:
   a server having a processor and a memory, the memory having cartographic data and a route stored therein to navigate from a beginning position to a desired destination, the cartographic data including data indicative of thoroughfares of a plurality of types, the route including a number of decision points; and
   wherein the processor operates on a route calculation algorithm and user-selectable preference levels, including high, medium, and low preference levels relating to a portion of a particular thoroughfare in a route in order to calculate a new route.

2. The navigation system of claim 1, wherein the system further includes:
   a mass data storage adapted to store navigation data; and
   a navigation device adapted to communicate with and retrieve the route and the cartographic data from the server via a communication channel, wherein the navigation device includes a display adapted to display the new route.

3. The navigation system of claim 1, wherein the communication channel includes a wireless channel.

4. The navigation system of claim 2, wherein the server includes a processor adapted to respond to a request from the navigation device by performing operations on the user-selectable preference levels relating to the portion of the particular thoroughfare and transmitting results to the navigation device.

5. The navigation system of claim 1, wherein the navigation device adapted to communicate with and retrieve the route and cartographic data from the server using cellular communication technology.

6. The navigation system of claim 1, wherein the server receives data relating to at least a portion of a particular thoroughfare in a route; and calculates a new route to the desired destination, in view of a selection of the preference levels, wherein the preference level selected is factored into whether a particular portion of a route is selected.

7. A navigation system with route calculation capabilities, comprising:
   a server having a processor and a memory, the memory having cartographic data and a route stored therein to navigate from a beginning position to a desired destination, the cartographic data including data indicative of thoroughfares of a plurality of types, the route including a number of decision points; and
   wherein the processor receives data relating to at least a portion of a particular thoroughfare in a route; and calculates a new route to the desired destination based on integral re-route distances.

8. The navigation system of claim 7, wherein the system further includes:
   a mass data storage adapted to store navigation data; and
   a navigation device adapted to communicate with and retrieve the route and the cartographic data from the server via a communication channel, wherein the navigation device includes a display adapted to display the new route.

9. The navigation system of claim 7, wherein the communication channel includes a wireless channel.

10. The navigation system of claim 8, wherein the server includes a processor adapted to respond to a request from the navigation device by performing operations on user-selectable preference levels relating to the portion of the particular thoroughfare and transmitting results to the navigation device.

11. The navigation system of claim 7, further including a navigation device adapted to communicate with and retrieve the route and cartographic data from the server using cellular communication technology.

12. The navigation system of claim 7, wherein the server calculates the new route to the desired destination, in view of a selection of the preference levels, wherein the preference level selected is factored into whether a particular portion of a route is selected.

* * * * *